United States Patent
Wood et al.

(10) Patent No.: US 12,499,055 B2
(45) Date of Patent: Dec. 16, 2025

(54) PROVIDING A SERVICE TO OBTAIN ATTRIBUTES OF MEMORY FRAMES

(71) Applicant: INTERNATIONAL BUSINESS MACHINES CORPORATION, Armonk, NY (US)

(72) Inventors: Christopher Lee Wood, Hyde Park, NY (US); Harris M. Morgenstern, Wappingers Falls, NY (US); Steven M. Partlow, Beacon, NY (US); Christine Michele Yost, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 18/538,397

(22) Filed: Dec. 13, 2023

(65) Prior Publication Data
US 2025/0199961 A1    Jun. 19, 2025

(51) Int. Cl.
*G06F 12/1009*  (2016.01)
(52) U.S. Cl.
CPC .............................. *G06F 12/1009* (2013.01)

(58) Field of Classification Search
CPC ................................................ G06F 12/1009
See application file for complete search history.

(56) References Cited

U.S. PATENT DOCUMENTS

| | | | |
|---|---|---|---|
| 9,870,386 B1 | 1/2018 | Madhavarapu et al. | |
| 2002/0120807 A1 | 8/2002 | Sutherland et al. | |
| 2005/0268028 A1* | 12/2005 | Mukherjee | G11C 15/00 |
| | | | 711/108 |
| 2014/0201493 A1 | 7/2014 | Foster et al. | |
| 2018/0004938 A1* | 1/2018 | Schilling | G06F 9/45545 |
| 2021/0318812 A1* | 10/2021 | Lidman | G06F 3/0622 |

FOREIGN PATENT DOCUMENTS

CN    107516052 A    12/2017

* cited by examiner

*Primary Examiner* — Chie Yew
(74) *Attorney, Agent, or Firm* — Onyx IP Group

(57) ABSTRACT

Providing a service to obtain attributes of memory frames includes receiving a query indicating a range of memory locations from a program. The method also includes identifying, in response to the query, page frame table data for one or more real memory frames corresponding to the range of memory locations. The method also includes generating, based on the page frame table data, defined output data describing attributes of the one or more real memory frames.

20 Claims, 6 Drawing Sheets

PROVIDING A SERVICE TO OBTAIN ATTRIBUTES OF MEMORY FRAMES

BACKGROUND

The present disclosure relates to methods, apparatus, and products for providing a service to obtain attributes of memory frames. Memory management data structures, such as page frame tables, are used by the operating system and other code modules in a computing system to track memory usage and allocation. For example, page frame tables are used by the memory management component of an operating system to determine the current user/owner of specific frames and to identify available memory frames. Applications or programs may use page frame table data to identify and track memory that has been assigned to them. Memory optimizers may use page frame table data to identify and track memory configurations for the purpose of analysis and optimization.

SUMMARY

According to embodiments of the present disclosure, various methods, apparatus and products for providing a service to obtain attributes of memory frames are described herein. In some aspects, providing a service to obtain attributes of memory frames includes receiving a query indicating a range of memory locations from a program. The method also includes identifying, in response to the query, page frame table data for one or more real memory frames corresponding to the range of memory locations. The method also includes generating, based on the page frame table data, defined output data describing attributes of the one or more real memory frames.

DETAILED DESCRIPTION

For a variety of reasons, applications may need to reference a page frame table of an operating system. As such, the page frame table is not typically read-protected (i.e., any program can read the page frame table). However, this presents a problem of possible overlays when applications try to read the page frame table. Further, applications reading and attempting to interpret the information in the page frame table can be error prone and may stifle future changes to the page frame table structure and information represented in the page frame table. Still further, malicious applications could exploit the page frame table.

In accordance with the present disclosure, a memory manager service provides an interface for querying attributes of real memory that would otherwise require an application to read and interpret the page frame table. The memory manager service may be an authorized service that can only be invoked by authorized applications (e.g. programs that run authorized in the z/Architecture), thus preventing unauthorized applications from reading the page frame table. The memory manager service improves the accuracy of the computing system by formalizing data retrieved from the page frame table and presenting the data consistently and descriptively to requesting applications, thus obviating the burden on the application to interpret the page frame table, while also improving security by restricting access to the interface by unauthorized applications. This also allows the page frame table to be read-protected, which improves security in the computing system. By providing a formalized interface for programs to obtain page frame table data, requesting programs can remain unaware of the page frame table structure. Thus, the page frame table structure can be expanded upon to include new properties, fields, or information without the need of the program to understand the modifications to the page frame table.

Figure 1:
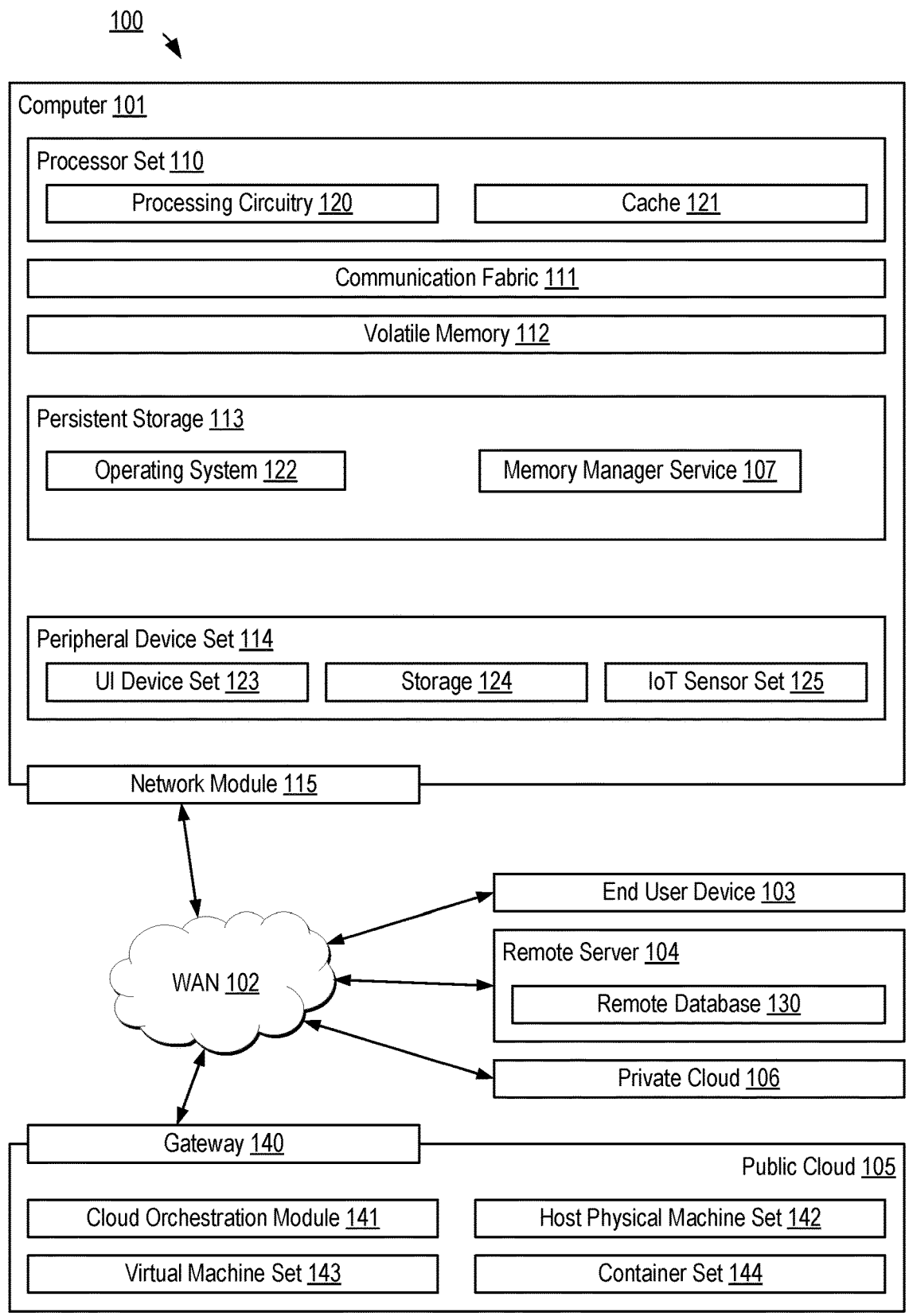
FIG. 1 sets forth an example computing environment according to aspects of the present disclosure.

FIG. 1 sets forth an example computing environment according to aspects of the present disclosure. Computing environment 100 contains an example of an environment for the execution of at least some of the computer code involved in performing the various methods described herein, such as memory manager service code 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
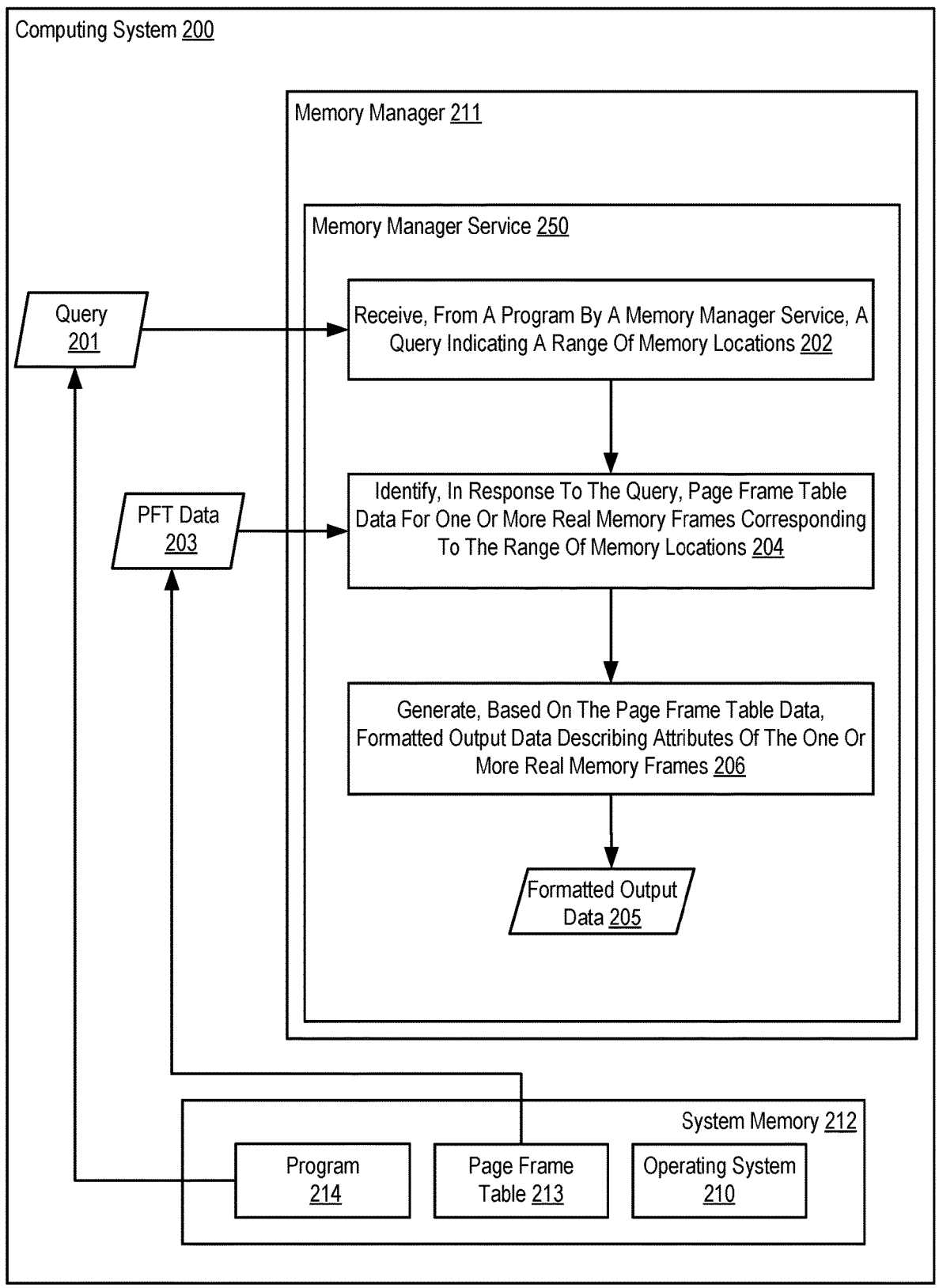
FIG. 2 sets forth an example method of providing a service to obtain attributes of memory frames in accordance with at least one embodiment of the present disclosure.

For further explanation, FIG. 2 sets forth a flowchart illustrating an example method of providing a service to obtain attributes of memory frames according to embodiments of the present disclosure. The example of FIG. 2 is described in the context of an example computing system 200 (e.g., the example computer 101 of FIG. 1). The example computing system 200 may be based on, for example, the z/Architecture offered by International Business Machines (IBM). Mainframe computing architectures, such as the z/Architecture, are particularly well-suited for the improvements described herein as such architectures typically involve multiple users or programs operating in multiple private address spaces concurrently, which requires more complex memory management. However, the use of such an architecture is provided only as one example for the computer system 200 and is not intended to limit the scope of the present disclosure. The computing system 200 includes an operating system 210 (e.g., the operating system 122 of FIG. 1) and a memory manager 211 configured to provide memory attribute information for system memory 212 to requesting applications. In a particular example, the operating system 210 may be the z/OS operating system. The memory manager 211 may be a component of the operating system 210 or a separate module. The example computing system 200 also includes one or more programs 214. In some examples, the programs 214 are applications embodied by a set of computer program instructions.

In some examples, the memory manager 211 maintains a page frame table 213. The page frame table includes an entry for each frame of real memory in system memory 212. Each frame tracked by the page frame table is a nominal unit of memory that is the smallest unit of memory which is allocated to applications. To aid explanation without limitation, the example nominal unit of memory is this disclosure is 4 kilobytes (KB), thus each page frame table entry corresponds to a 4-KB frame. However, these base frames can be combined into larger frames for allocation. As frames are allocated or reclaimed, the page frame table entry for that frame is updated by the memory manager 211. Each page frame table entry includes a number of fields that characterize the frame. In some implementations, each entry is 64-bytes.

In accordance with the present disclosure, a memory manager service 250 provides a service for querying attributes of real memory that would otherwise be interpreted by the application by reading the page frame table 213. In some implementations, the memory manager service 250 is an authorized service that can only be invoked by authorized applications (e.g. programs that run authorized in the z/Architecture). The memory manager service 250 improves the accuracy of memory attribute information available to an application by formalizing data retrieved from the page frame table and presenting the data consistently and descriptively to requesting applications, thus obviating the burden on the application to interpret the page frame table, while also improving security by restricting access to the interface by unauthorized applications. This also allows the page frame table to be fetch-protected, which improves security in the computing system 200. The memory manager service 250 may be a service or a macro that is provided by the operating system 210 or memory manager 211. Example functionality of the memory manager service 250 is now described.

The method of FIG. 2 includes receiving 202, from a program 214 through a memory manager service 250, a query 201 indicating a range of memory locations. In some examples, the memory manager service 250 is configured to receive structured queries with a set of query parameters from authorized programs and services. In some implementations, the query parameters include a query type. For example, the query type may indicate that the query 201 is directed to the attributes real memory frames. In such examples, the query parameters also include a starting real memory address, which is the initial real memory address of the starting real memory frame in a range of real memory frames. In such implementations, the query parameters also include an indication of the extent of the range of real memory frames targeted by the query 201, or range limit. For example, the range limit may be expressed as the count of real memory base frames (e.g., 4-KB frames) that are the target of the query. If only one real memory frame is targeted, the count may be indicated as zero. In other examples, the range limit may be expressed as an ending real memory address, which may be the initial real memory address of the last real memory frame in the range. It will be appreciated that, in other implementations, the range of real memory frames targeted by the query 201 can be expressed in other ways, such as by providing a frame identifier or other identifying information for the targeted frames.

As another example, the query type may indicate that the query 201 is directed to the attributes of virtual memory pages. In such examples, the query parameters also include a starting virtual memory address, which is the initial virtual memory address of the starting virtual memory page in a range of virtual memory pages. In such implementations, the query parameters also include an indication of the extent of the range of virtual memory pages targeted by the query 201, which may be similar to the range of real memory frames discussed above. To provide output data for real memory frames associated with the virtual memory pages, the memory manager service 250 performs an address translation, which is discussed in more detail below.

In some implementations, the query parameters of the query 201 also include an output area that is specified by the invoking program 214. The output area may be a destination memory location to which the query response data is written, such that the program 214 can read the response data. The query parameters may also indicate the size or length of the output area.

The method of FIG. 2 also includes identifying 204, in response to the query 201, page frame table data 203 for one or more real memory frames corresponding to the range of memory locations. In some examples, the memory manager 211 maintains a page frame table 213, as mentioned above. The page frame table 213 includes an entry for each real memory frame that includes data that characterizes the frame. For example, the entry may be associated with a starting memory address for the frame (e.g., identifiable by the frame number and frame size) and can include a number of fields that indicate the properties of that frame. In a particular example, the fields of the page frame table entry include a frame type, a frame size, usage (e.g., what memory objects or data structures the frame is backing), a virtual memory address of a virtual memory frame that the real memory frame is backing, the memory protection key of the frame, whether the frame is fetch-protected, the address space identifier or other identifier of a resource that owns the frame, whether the frame is used or unused, whether the frame is online, offline, and reconfigurable, a memory area in which the frame is located (e.g., an area of dedicated memory), whether the frame has been aged or is being paged, and/or whether the frame is fixed, among other properties that are discussed below. It will be appreciated that properties and attributes discussed herein are provided as examples and should not be construed as an exhaustive list. One or ordinary skill in the art will recognize that other properties may be reflected in a page frame table entry.

In some implementations, the memory manager service 250 identifies 204, in response to the query 201, page frame table data 203 for one or more real memory frames corresponding to the range of memory locations by identifying a starting memory address from the query, locating the page frame table entry for the frame with that starting memory address, and inspecting the fields of the page frame table entry to identify the properties of the frame that was located based on the starting memory address. These properties may be used to generate output data that describes attributes of the frame, as discussed below. The memory manager service 250 then locates the page frame table entry of the next frame in the range, i.e., the next contiguous frame, and inspects the entry to identify the properties of the frame. The memory manager interface continues the process until the end of the range specified in the query 201 has been reached.

The method of FIG. 2 also includes generating 206, based on the page frame table data 203, defined output data 205 describing attributes of the one or more real memory frames. In some examples, the operating system interface generates 206 the defined output data 205 by transforming the page frame table data 203 into output data 205 that is readily understood by the application invoking the interface. For example, the output data may be represented in a key/length/data format, mark-up language, or other form of typed data. With the key/length/data format, a key is used to identify the data type, and the length indicates where the next key resides. In some implementations, the output data 205 is written to a memory location specified by the output area parameter that is passed in the query 201.

In some implementations, the defined output data is organized into one or more records that describe attributes of at least one real memory frame. In some examples, each record may indicate the length of the record, the offset from the start of the instant record to the next record. The record may also indicate the number or range of real memory frames that the record represents. Contiguous real memory frames that share the same attributes (except for the address of the frame, which is incremented in accordance with frame size) may be represented by the same record. The record has a defined format that will be recognizable by the program invoking the query. Some attributes in the record may be represented by constants that are defined in the system and may too be understood by the program invoking the query.

The attributes of the real memory frame include the real memory address of the frame and, if any, a virtual memory address that is backed by the real memory frame. The attributes of the real memory frame also indicate the frame size (e.g., a 4-KB, 1-MB, or 2-GB frame). The attributes of the real memory frame also indicate the application, if any, that owns the frame (i.e., program to which the frame has been allocated). For example, in the z/Architecture owner of the frame may be represented by the address space identifier for the private address space in which the application executes. However, it will be appreciated that other identifiers may be used to identify an application or system component that owns the real memory frame.

The attributes of the real memory frame also include the memory protection key of the frame and may further indicate whether the frame is fetch-protected (e.g., read protected). The memory protection key ensures that a program can only write to the allocated memory (or read the allocated memory if it is fetch-protected) if the memory protection key matches a program key. In a particular example, the z/Architecture the information in system memory is protected from unauthorized use by means of multiple protection keys. A control field in storage called a key is associated with each frame (e.g., 4-KB frame) of real memory. When a request is made to modify the contents of a system memory location, the program key associated with the request is compared to the memory protection key. If the keys match or the program is executing in key 0, the request is satisfied. If the key associated with the request does not match the memory protection key, the system rejects the request and issues a program exception interruption. When a request is made to read (or fetch) the contents of a system memory location, the request is automatically satisfied unless the fetch protect bit is on, indicating that the frame is fetch-protected. When a request is made to access the contents of a fetch-protected system memory location, the memory protection key is compared to the program key associated with the request. If the keys match, or the requestor is in key 0, the request is satisfied. If the keys do not match, and the requestor is not in key 0, the system rejects the request and issues a program exception interruption.

The attributes of the real memory frame may also indicate whether the frame has been aged, whether paging I/O is in progress for the frame, and/or whether the frame is fixed. The attributes of the real memory frame may also indicate whether the frame represents disabled reference (DREF) memory, whether the frame backs data, and/or or whether the frame is transition from one state to another. In still further examples, each record may indicate one or more frame type properties and/or one or more usage type properties for the real memory frame, which are described in more detail below.

In some implementations, the frame type properties may reflect that the frame is offline, the frame is reconfigurable, the frame is permanently in use by the system, the frame is from an area allotted for data address translation (DAT) structures, the frame is from an area reserved for 2-GB frames, or the frame is from a dedicated memory area. Dedicated memory is assigned to the application before application execution (e.g., upon initial program load in z/Architecture) and is reserved for the application until application completion, regardless of whether the application uses the assigned dedicated memory. Thus, dedicated memory facilitates rapid memory allocation to the application such that the application does not compete with other applications for those memory resources.

In some implementations, the usage type properties may indicate that the frame is in use by a particular address space corresponding to an application, or that the frame is owned by that application. These properties may also reflect that the frame backs 31-bit or 64-bit private storage, the frame backs a data space, the frame backs a local system queue area (LSQA), the frame backs a 2-GB page, the frame backs a dynamic address translation (DAT) table, the frame is a freemained or released frame, and so on. In other examples, the usage type properties may reflect that the frame is not used by an address space (e.g., an application) but may be used for some other function (e.g., the frame is used by the system). For example, these properties may reflect whether the frame is in use or available, the frame is online or offline, the frame is online but not initialized, the frame is used by the system, the frame backs the nucleus, the frame backs the link pack area, the frame backs the memory manager or page frame table space, the frame is in transition, the frame is flawed, and so on. In some examples, the usage type properties may reflect that the frame is not in use but is assigned to an address space, the frame is associated with common memory, the frame is shared (e.g., the frame backs a share group, a shared segment, or a high virtual shared area), and so on.

Thus, the memory manager service 250 transforms data fields of the page frame table entry into a defined data format such as the key/length/data format. This data is easily interpreted by programs requesting the data. The memory manger service 250 improves the accuracy of memory attribute and memory configuration information used by applications by providing defined output data that obviates interpretation of page frame table data by programs that may misinterpret the information. The memory manger service 250 improves system security by restricting access to the service to authorized program. As a result, the page frame table structure can be altered or expanded upon without the need of the program to understand the page frame table structure. Thus, when the system is modified to include memory enhancements and the page frame table entries are expanded to reflect these new attributes, programs that use information in the page frame table do not require special knowledge of the changes to the page frame table.

Figure 3:
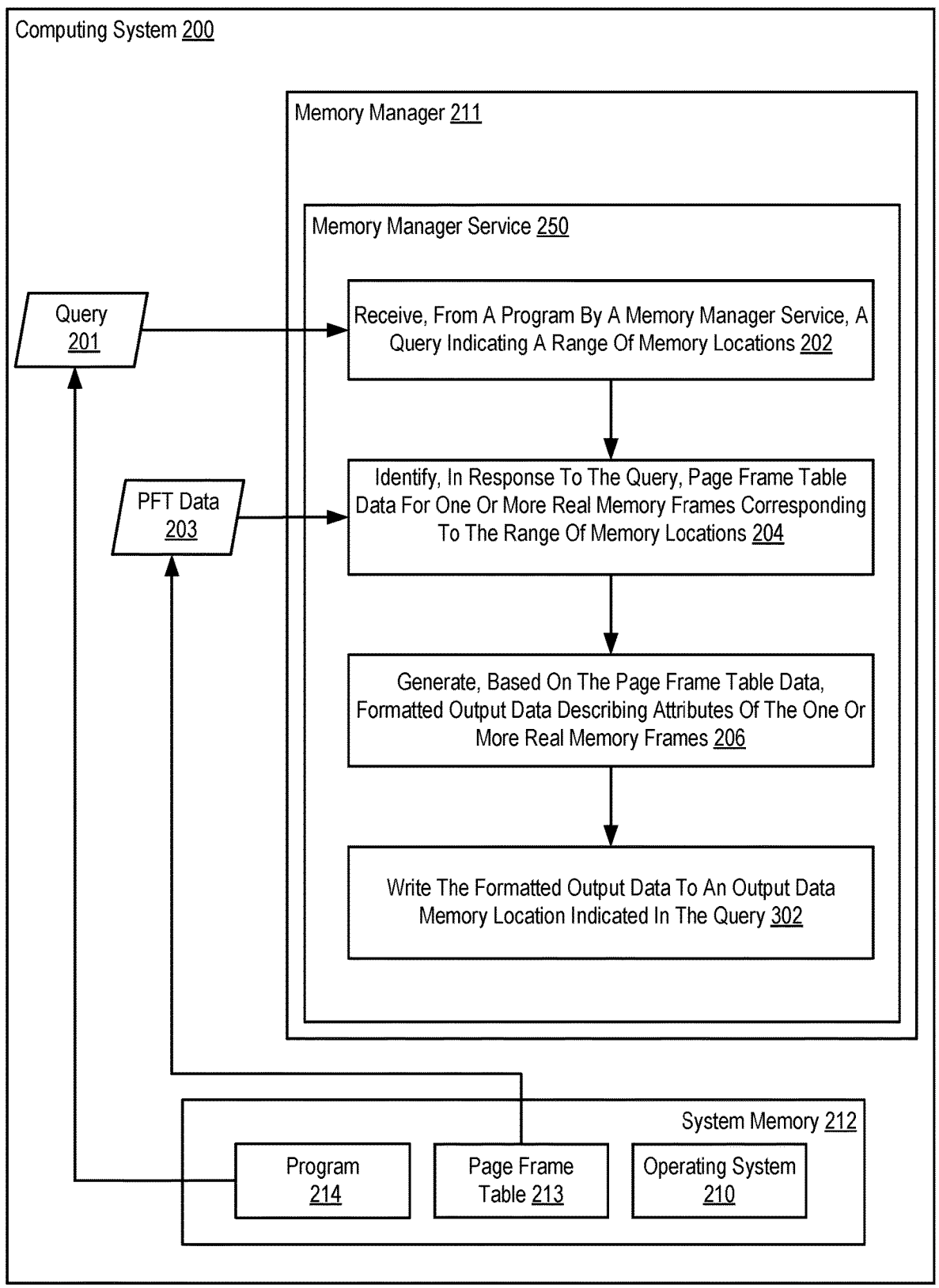
FIG. 3 sets forth an example method of providing a service to obtain attributes of memory frames in accordance with at least one embodiment of the present disclosure.

For further explanation, FIG. 3 sets forth a flow chart of another example method of providing a service to obtain attributes of memory frames in accordance with the present disclosure. The method of FIG. 3 extends the method of FIG. 2 in that the method of FIG. 3 includes writing 302 the defined output data 205 to a memory location indicated in the query 201. In some examples, the invoking program 214 provides a memory location, such as a starting memory address of a frame allocated to the program, to receive the output data 205 generated in response to the query 201. In these examples, the memory manager service 250 stores the output data 205 in the designated output location. For example, the program 214 may pass parameter indicating a memory location by the starting memory address of one or more data space frames assigned to the program. After submitting the query 201, the program 214 reads the generated output data from the memory location.

Figure 4:
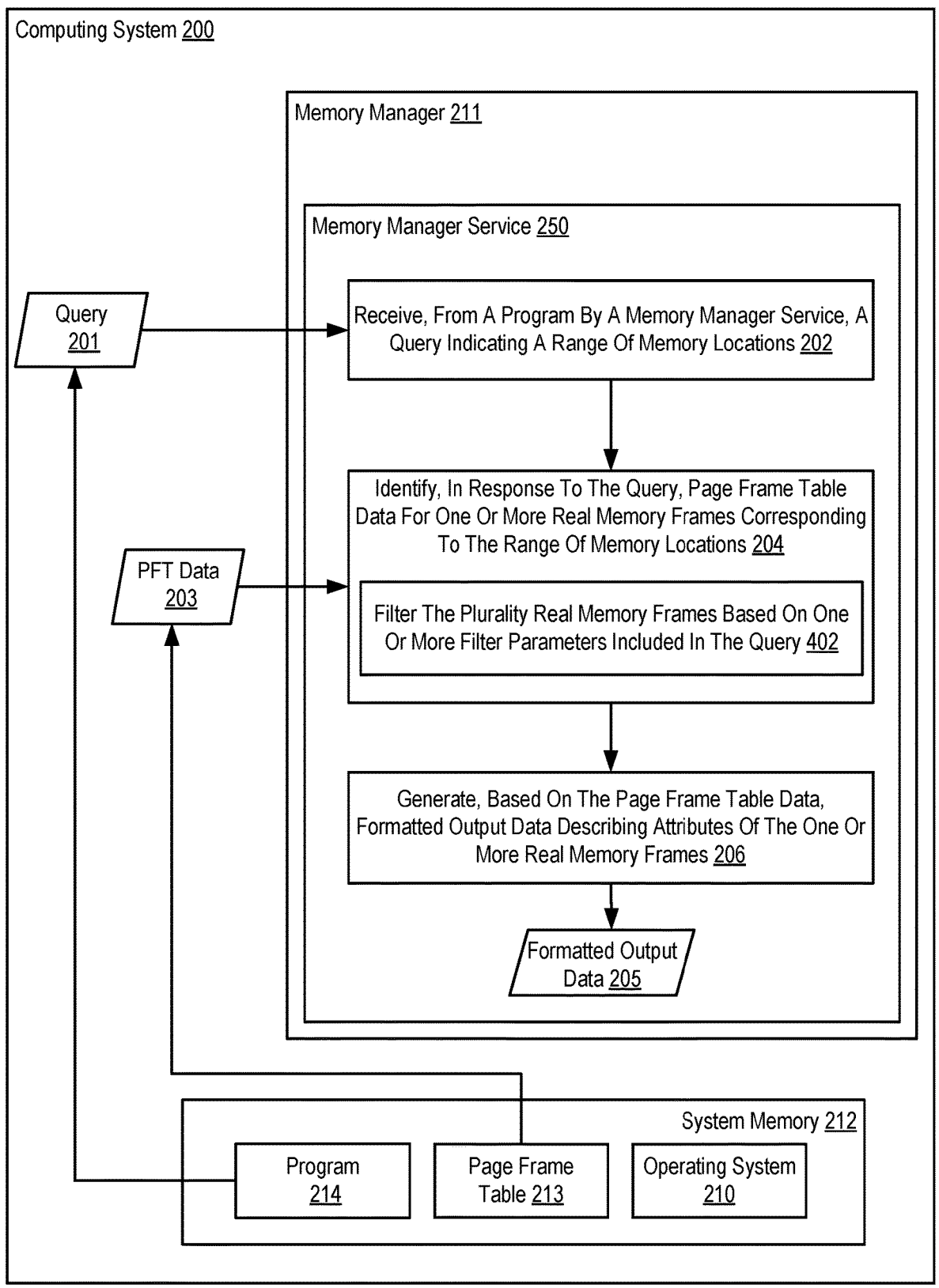
FIG. 4 sets forth an example method of providing a service to obtain attributes of memory frames in accordance with at least one embodiment of the present disclosure.

For further explanation, FIG. 4 sets forth a flow chart of another example method of providing a service to obtain attributes of memory frames in accordance with the present disclosure. The method of FIG. 4 extends the method of FIG. 1 in that identifying 204, in response to the query 201, page frame table data 203 for one or more real memory frames corresponding to the range of memory locations includes filtering 402 the plurality real memory frames based on the one or more filter parameters included in the query 201. In some implementations, the page frame table entry for each frame includes a field that indicates an identifier associated with the program (e.g., application, job step program, system service, operating system module) to which the frame has been allocated or assigned. In a particular example, the identifier is an address space identifier of the private address space in which the program executes. In the z/Architecture, for example, such an identifier is referred to as a space token, or 'stoken.' The identifier may be provided in the query 201 as filter parameter. Thus, in some examples, the memory manager service 250 filters 402 the plurality real memory frames based on the one or more filter parameters included in the query 201 by inspecting the page frame table 213 and locating frames, within the range of frames indicated in the query 201, that are assigned to or associated with the identifier that is provided as a filter parameter. For example, where the range of frames indicated in the query 201 includes frames X through Z, and the query 201 includes a filter parameter that indicates a particular address space identifier, the memory manager service 250 inspects the page frame table 213 and identifies only entries for frames within the range of X through Z that are allocated or assigned to a program associated with that particular address space identifier as the source for the output data that describes the frame attributes. In some examples, when an address space identifier is provided as a filter parameter, the memory manager service 250 also identifies data frames (i.e., frames that are used to back data spaces in system memory) that are associated with the address space identifier.

Figure 5:
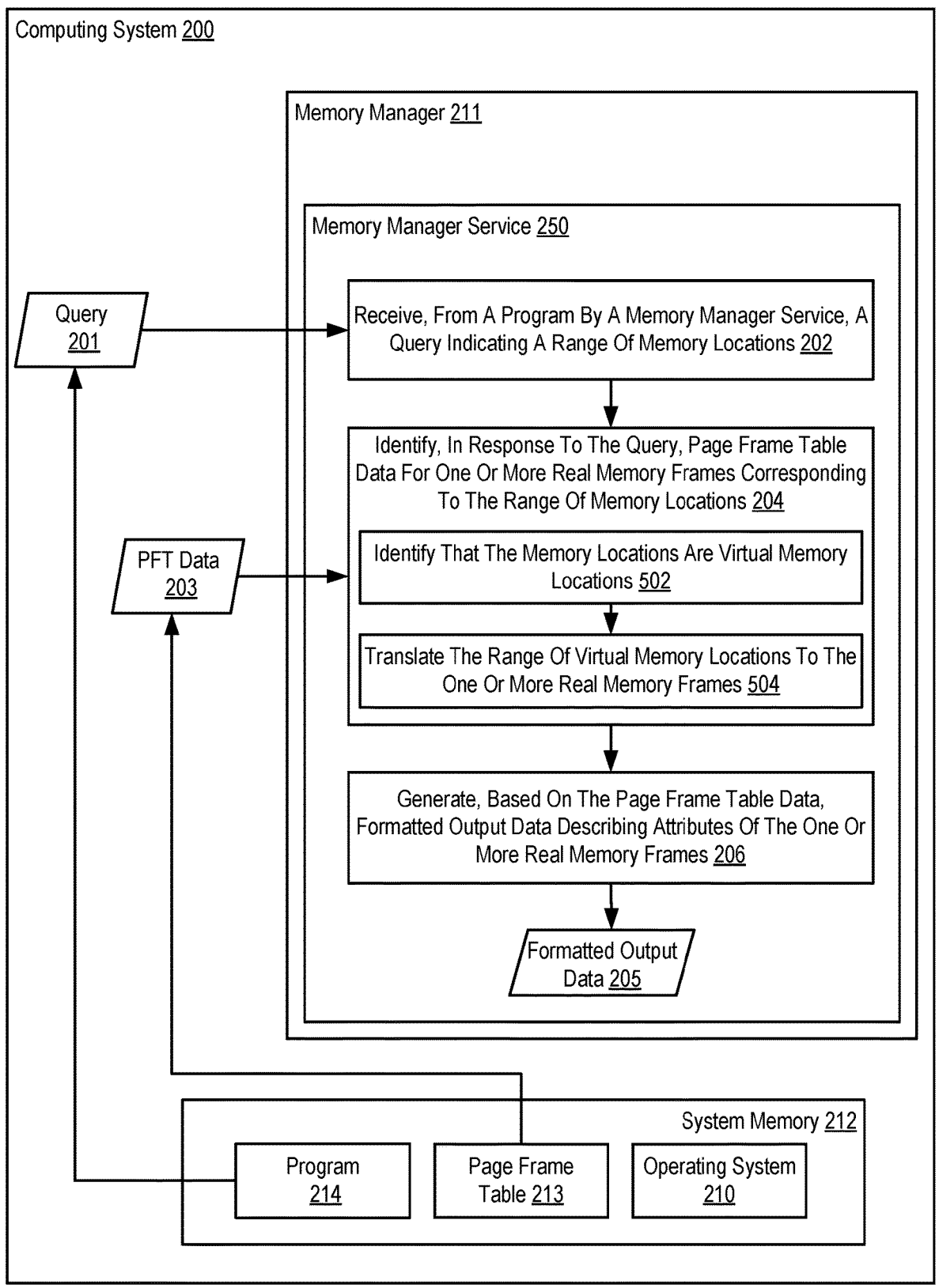
FIG. 5 sets forth an example method of providing a service to obtain attributes of memory frames in accordance with at least one embodiment of the present disclosure.

For further explanation, FIG. 5 sets forth a flow chart of another example method of providing a service to obtain attributes of memory frames in accordance with the present disclosure. The method of FIG. 5 extends the method of FIG. 1 in that identifying 204, in response to the query 201, page frame table data 203 for one or more real memory frames corresponding to the range of memory locations includes identifying 502 that the memory locations are virtual memory locations. As discussed above, in some examples, the query 201 may indicate a request type and the request type may indicate that the targeted range of memory locations are virtual memory locations. In such examples, when the request type targets virtual memory, the starting memory address that is passed as a query parameter is recognized as a starting virtual memory address.

The method of FIG. 5 also includes translating 504 the range of virtual memory locations to the one or more real memory frames. In some examples, the memory manager service 250 translates the virtual memory address that is passed as a query parameter to a frame of real memory by locating the page frame table entry that includes the virtual memory address. For example, the memory manager service 250 can convert the range of virtual memory addresses to corresponding page frame table entries by walking the DAT tables.

In some implementations, when the request type of the query 201 indicates virtual memory, the query definition requires that a filter parameter is specified to limit the query to frame whose ownership is associated with a particular identifier (e.g., an address space identifier). This can improve the response time. If this identifier is not provided in the query 201, the memory manager service 250 may use the address space identifier of the program invoking the query as the default identifier that is used as a filter for page frame table data.

Figure 6:
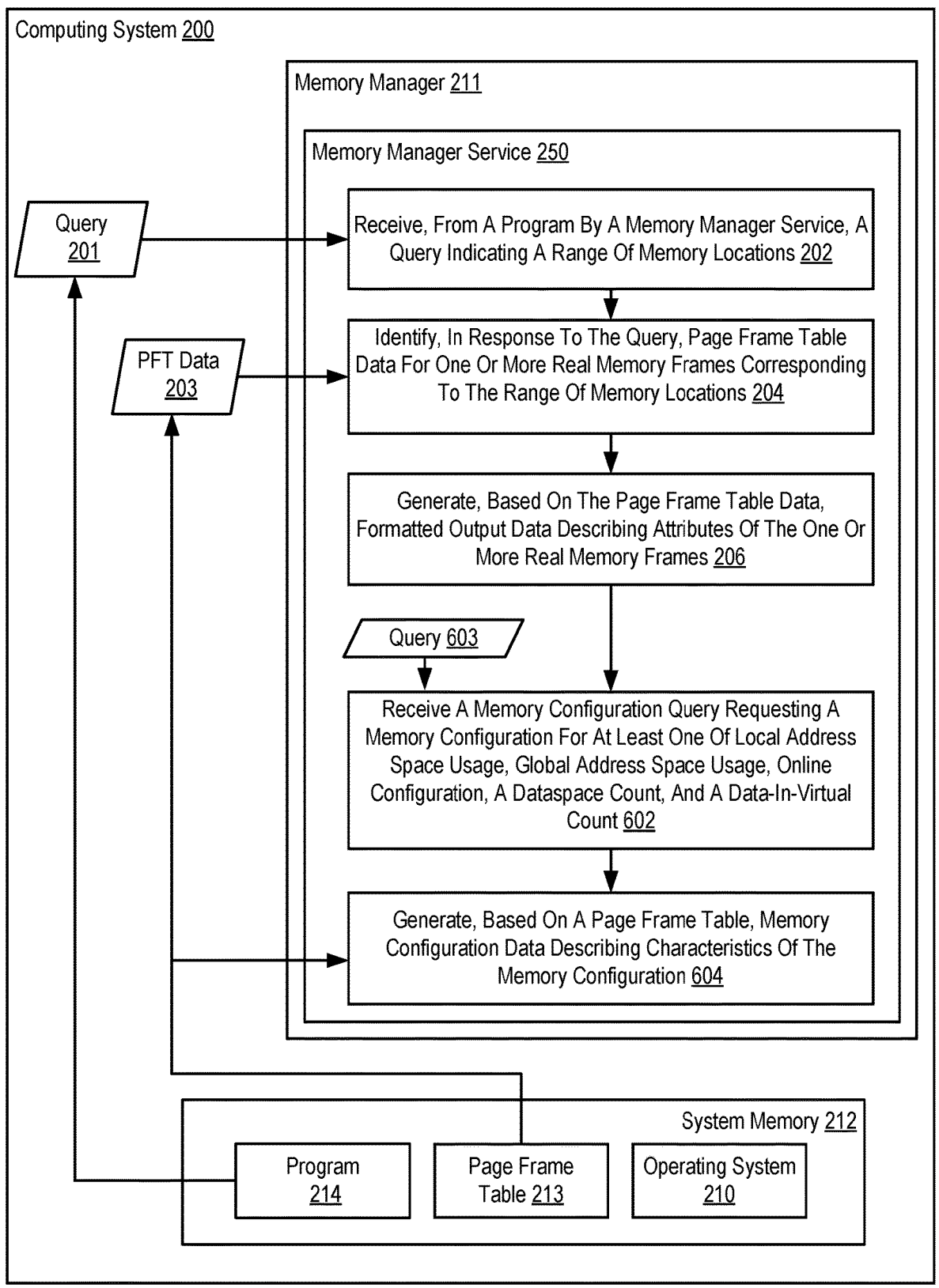
FIG. 6 sets forth an example method of providing a service to obtain attributes of memory frames in accordance with at least one embodiment of the present disclosure.

For further explanation, FIG. 6 sets forth a flow chart of another example method of providing a service to obtain attributes of memory frames in accordance with the present disclosure. The method of FIG. 6 extends the method of FIG. 1 in that the method of FIG. 6 also includes receiving 602 a memory configuration query 603 requesting a memory configuration for at least one of local address space usage, global address space usage, online configuration, a dataspace count, and a data-in-virtual count. In some implementations, the memory configuration query 603 may indicate a request type as discussed above, however the memory configuration query definition does not require that a range of memory locations be specified. The request type may indicate one of local address space usage, global address space usage, online configuration, a data space count, and a data-in-virtual count. These request types are explained in greater detail below.

In some implementations, the query parameters of the query 603 also include an output area that is specified by the invoking program 214. The output area may be a memory location to which the query response data is written, such that the program 214 can read the response data. The query parameters may also indicate the size or length of the output area.

The method of FIG. 6 also includes generating 604, based on a page frame table 213, memory configuration data describing characteristics of the memory configuration. In some examples, the memory manager service 250 generates memory configuration data by inspecting the page frame table to identify how real memory is being used in the computing system.

In some examples, the memory configuration query directed to local address space usage returns a count of real memory frames in that address space that are in use by a program, as well as a count of dedicated memory frames that have been assigned to the address space (regardless of whether they are in use). The query definition for a memory configuration query directed to local address space usage also requires an address space identifier to be passed as a query parameter.

In some examples, the memory configuration query directed to global address space usage returns a list of system features and a count of real memory frames that are used to back each feature. For example, the query 603 may indicate that X number of frames are used to back virtual memory, Y number of frames are reserved for dedicated memory, Z number of frame are used to back the operating system modules, and so on.

In some examples, the memory configuration query directed to online configuration returns a global count of the number of frames that are configured as online in the computing system and a global count of the number frames that are configured as offline in the computing system.

In some examples, the memory configuration query directed to a data space count returns a count of real memory frames that are in use by a program to back a data space. Memory allocated for a data space is assigned to the program but is only used to store data; that is, no aspect of the program executes in the data space. The query definition for a memory configuration query directed to a data space count also requires either a data space identifier or an address space identifier to be passed as a query parameter. If an address space identifier is passed, information about all data spaces owned by the address space is returned.

In some examples, the memory configuration query directed to a data-in-virtual count returns a count of real memory frames that are in use by an address space or data space that backs some data-in-virtual memory object. The data-in-virtual memory object is mapped to a data space of real memory frames.

In view of the explanations set forth above, readers will recognize a number of advantages of providing a service to obtain attributes of memory frames according to embodiments of the present disclosure including:

the service improves accuracy in a computing system by providing a formalized mechanism for programs to obtain memory attribute information stored in the page frame table;

the service improves program accuracy by providing defined output data that obviates interpretation of page frame table data by programs that may misinterpret the information;

the service improves system security by restricting access to the service to authorized program; and the page frame table structure can be altered or expanded upon without the need of the program to understand the page frame table structure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, from a program by a memory manager service, a query indicating a request for attributes of a range of memory locations;
   identifying, in response to the query, page frame table data for one or more real memory frames corresponding to the range of memory locations;
   generating, based on the page frame table data, defined output data describing attributes of the one or more real memory frames; and
   providing to the program, by the memory manager service in response to the request, the defined output data describing the attributes of the one or more real memory frames.

2. The method of claim 1, wherein the program must be authorized to invoke the memory manager service.

3. The method of claim 1, wherein the query indicates whether the range of memory locations is within real memory or virtual memory.

4. The method of claim 1, wherein the query includes a starting memory address, a range limit, and an output data destination for the defined output data.

5. The method of claim 4 further comprising:
   writing the defined output data to the output data destination indicated in the query.

6. The method of claim 1 further comprising:
   identifying, based on a page frame table, a set of properties of the one or more real memory frames corresponding to the range of memory locations; and
   filtering the one or more real memory frames based on one or more filter parameters included in the query.

7. The method of claim 6, wherein, for each real memory frame, a page frame table indicates an address space of a particular program that owns the real memory frame, and wherein the one or more of real memory frames are filtered based on an address space identifier for the particular program specified in the one or more filter parameters.

8. The method of claim 1 further comprising:
   identifying, based on a page frame table, properties of the one or more real memory frames corresponding to the range of memory locations;
   identifying that the range of memory locations are virtual memory locations; and
   translating the virtual memory locations to the one or more real memory frames.

9. The method of claim 1, wherein the attributes described in the defined output data includes a real memory address, an identifier of an address space that owns a real memory frame of the one or more real memory frames, a memory protection key, and an indication of whether the real memory frame is fetch-protected.

10. The method of claim 1, wherein the attributes described in the defined output data includes a count of real memory frames that back a particular usage type for each of a plurality of usage types.

11. The method of claim 1, wherein the attributes described in the defined output data includes an indication of at least one of whether a real memory frame of the one or more real memory frames is offline, whether the real memory frame is reconfigurable, whether the real memory frame is fixed, and whether the real memory frame is located in an area of dedicated memory.

12. The method of claim 1 further comprising:
receiving a memory configuration query requesting a memory configuration for at least one of local address space usage, global address space usage, online configuration, a dataspace count, and a data-in-virtual count; and
generating, based on a page frame table, memory configuration data describing characteristics of the memory configuration.

13. An apparatus comprising:
a processing device; and
memory operatively coupled to the processing device, wherein the memory stores computer program instructions that, when executed, cause the processing device to:
receive, from a program by a memory manager service, a request for attributes of a query indicating a range of memory locations;
identify, in response to the query, page frame table data for one or more real memory frames corresponding to the range of memory locations;
generate, based on the page frame table data, defined output data describing attributes of the one or more real memory frames; and
provide, by the memory manager service in response to the request, the defined output data describing the attributes of the one or more real memory frames to the program.

14. The apparatus of claim 13, wherein the query indicates whether the range of memory locations is within real memory or virtual memory.

15. The apparatus of claim 13, wherein the query includes a starting memory address, a range limit, and an output data destination for the defined output data.

16. The apparatus of claim 13 further comprising:
identifying, based on a page frame table, a set of properties of the one or more real memory frames corresponding to the range of memory locations; and
filtering the one or more real memory frames based on one or more filter parameters included in the query.

17. The apparatus of claim 16, wherein, for each real memory frame, a page frame table indicates an address space of a particular program that owns the real memory frame, and wherein the one or more of real memory frames are filtered based on an address space identifier for the particular program specified in the one or more filter parameters.

18. The apparatus of claim 13 further comprising:
identifying, based on a page frame table, properties of the one or more real memory frames corresponding to the range of memory locations;
identifying that the range of memory locations are virtual memory locations; and
translating the virtual memory locations to the one or more real memory frames.

19. A computer program product comprising a computer readable storage medium, wherein the computer readable storage medium comprises computer program instructions that, when executed:
receive, from a program by a memory manager service, a query indicating a request for attributes of a range of memory locations;
identify, in response to the query, page frame table data for one or more real memory frames corresponding to the range of memory locations;
generate, based on the page frame table data, defined output data describing attributes of the one or more real memory frames; and
provide, by the memory manager service in response to the request, the defined output data describing the attributes of the one or more real memory frames to the program.

20. The computer program product of claim 19, wherein the attributes described in the defined output data includes a real memory address, an identifier of an address space that owns a real memory frame of the one or more real memory frames, a memory protection key, an indication of whether the real memory frame is fetch-protected, an indication of a frame type, and an indication of a usage type.

* * * * *